(12) United States Patent
Barnes et al.

(10) Patent No.: US 12,048,894 B2
(45) Date of Patent: Jul. 30, 2024

(54) C1—C8 CARBOXYLIC ACID SALT SOLUTION FOR THE ABSORPTION OF $CO_2$

(71) Applicant: C-Capture Ltd, Leeds (GB)

(72) Inventors: Douglas Barnes, Leeds (GB); Caspar Schoolderman, Leeds (GB); Gergely Jakab, Leeds (GB); Christopher Rayner, Leeds (GB)

(73) Assignee: C-Capture Ltd, Leeds (GB)

( * ) Notice: Subject to any disclaimer, the term of this patent is extended or adjusted under 35 U.S.C. 154(b) by 8 days.

(21) Appl. No.: 17/834,225

(22) Filed: Jun. 7, 2022

(65) Prior Publication Data

US 2022/0297053 A1   Sep. 22, 2022

Related U.S. Application Data

(63) Continuation of application No. 16/634,743, filed as application No. PCT/GB2018/052209 on Aug. 2, 2018, now Pat. No. 11,351,498.

(30) Foreign Application Priority Data

Aug. 2, 2017 (GB) .................................... 1712465

(51) Int. Cl.
*B01D 53/62* (2006.01)
*B01D 53/14* (2006.01)
(Continued)

(52) U.S. Cl.
CPC ..... *B01D 53/1493* (2013.01); *B01D 53/1425* (2013.01); *B01D 53/1475* (2013.01); *B01D 53/62* (2013.01); *B01D 53/78* (2013.01); *B01D 2251/70* (2013.01); *B01D 2251/80* (2013.01); *B01D 2252/103* (2013.01);
(Continued)

(58) Field of Classification Search
None
See application file for complete search history.

(56) References Cited

U.S. PATENT DOCUMENTS 1,934,472 A   11/1933  Allen
1,964,808 A   7/1934  Bottoms
(Continued)

FOREIGN PATENT DOCUMENTS

CN    102764566 A    11/2012
CN    105939774 A    9/2016
(Continued)

OTHER PUBLICATIONS

International Search Report and Written Opinion issued in counterpart PCT Application No. PCT/GB2018/052209 dated Nov. 15, 2018 (fourteen (14) pages).
(Continued)

*Primary Examiner* — Daniel Berns
(74) *Attorney, Agent, or Firm* — E. Eric Mills; Nicholas P. Stadnyk; Maynard Nexsen PC (57) ABSTRACT

The invention provides a method for the capture of at least one acid gas in a composition, the release of said gas from said composition and the subsequent regeneration of said composition for re-use. The method comprises the step of capturing an acid gas by contacting said acid gas with a capture composition comprising at least one salt of a carboxylic acid dissolved in a solvent system consisting substantially of water.

23 Claims, 4 Drawing Sheets

(51) Int. Cl.
 B01D 53/78 (2006.01)
 B01D 53/96 (2006.01)
(52) U.S. Cl.
 CPC .. B01D 2252/205 (2013.01); B01D 2252/504 (2013.01); B01D 2257/504 (2013.01); B01D 2258/0283 (2013.01)

(56) References Cited

U.S. PATENT DOCUMENTS

| | | |
|---|---|---|
| 1,990,217 A | 2/1935 | Baehr |
| 2,031,632 A | 2/1936 | Bottoms |
| 2,840,450 A | 6/1958 | Giammarco |
| 3,037,844 A | 6/1962 | Giammarco |
| 4,217,238 A | 8/1980 | Sartori et al. |
| 4,320,101 A | 3/1982 | Trentham et al. |
| 4,363,791 A | 12/1982 | Trentham et al. |
| 4,440,731 A | 4/1984 | Pearce |
| 4,446,119 A | 5/1984 | DuPart et al. |
| 4,624,838 A | 11/1986 | Pan et al. |
| 4,775,519 A | 10/1988 | Yit Nieh |
| 4,973,456 A | 11/1990 | Quinn et al. |
| 7,799,299 B2 | 9/2010 | Heldebrant et al. |
| 10,279,307 B2 | 5/2019 | Rayner et al. |
| 10,335,735 B2 | 7/2019 | Chen et al. |
| 2005/0012959 A1 | 1/2005 | Yoshida |
| 2006/0015480 A1 | 1/2006 | Conahan et al. |
| 2010/0186590 A1 | 7/2010 | Vorberg et al. |
| 2010/0236408 A1 | 9/2010 | Asprion et al. |
| 2013/0175471 A1 | 7/2013 | Wagner et al. |
| 2015/0010453 A1 | 1/2015 | Gellett et al. |
| 2017/0001142 A1 | 1/2017 | Rayner et al. |

FOREIGN PATENT DOCUMENTS

| | | |
|---|---|---|
| GB | 391786 A | 5/1933 |
| GB | 786669 A | 11/1957 |
| GB | 798856 A | 7/1958 |
| GB | 925648 A1 | 5/1963 |
| GB | 1091261 A | 11/1967 |
| GB | 1330604 A | 9/1973 |
| GB | 1501195 A | 2/1978 |
| TW | I646050 B | 1/2019 |
| TW | I647001 B | 1/2019 |
| WO | 2006/082436 A | 8/2006 |
| WO | 2008/068411 A2 | 6/2008 |
| WO | 2008/091976 A1 | 7/2008 |
| WO | 2009/066754 A1 | 5/2009 |
| WO | 2011/135378 A1 | 11/2011 |
| WO | 2012/031281 A2 | 3/2012 |
| WO | 2013166301 A1 | 11/2013 |
| WO | 2015092427 A2 | 6/2015 |
| WO | 2015092427 A3 | 6/2015 |
| WO | 2016057918 A1 | 4/2016 |

OTHER PUBLICATIONS

Hu Guoping et al: "Carbon dioxide absorption into promoted potassium carbonate solutions: A review." International Journal of Greenhouse Gas Control. Elsevier. Amsterdam. NL. vol. 53. Jul. 30, 2016 (Jul. 30, 2016).
GB Search Report issued in counterpart GB Application No. 1712465.2 dated Feb. 15, 2018 (six (6) pages).
Khatri, R.A., Chuang, S.S.C., Soong, Y. and Gray, M., Energy and Fuels, 2006, 20, 1514.
Song, C., Catalysis Today, 2006, 115, 2.
Idem, R. and Tontiwachwuthikul, P., Ind. Eng. Chem. Res., 2006, 45, 2413.
Freund, P., Proc. Instn. Mech. Engrs. Part A: J. Power and Energy, 2003, 217, 1.
Steeneveldt, R., Berger, B. and Torp, T.A., Trans. IChemE, Part A, Chem. Eng. Res. and Design, 2006, 84(A9), 739.
MacDowell, N., Florin, N., Buchard, A., Hallett, J., Galindo, A., Jackson, G., Adjiman, C.S., Williams, C.K., Shah, N. and Fennell, P., Energy Environ. Sci., 2010, 3, 1645.
Jassim, M.S. and Rochelle, G.T., Ind. Eng. Chem. Res., 2006, 45, 2465.
Poplsteinova, J., Krane, J. and Svendsen, H.F., Ind. Eng. Chem. Res., 2005, 44, 9894.
Yoon, S.Y., Lee, H., Chem. Lett., 2003, 32, 344.
Park, J-Y., Yoon, S.J. and Lee, H., Environ. Sci. Technol., 2003, 37, 1670.
McCann, N., Phan, D., Attalla, M., Puxty, G., Fernandes, D., Conway, W., Wang, X., Burns, R., van Altena, I., Lawrance, G. and Maeder, M., Energy Procedia 1, 2009, 955.
McCann, N., Phan, D., Wang, X., Conway, W., Burns, R., Attalla, M., Puxty, G. and Maeder, M., J. Phys. Chem. A, 2009, 113, 5022.
Idem, R.O., Wilson, M., Tontiwachwuthikul, P., Chakma, A., Veawab, A., Aronwilas, A. and Gelowitz, D., Ind. Eng. Chem. Res., 2006, 45, 2414.
Bara, J.E., GHG Sci. Technol., 2012, 2, 1.
Abanades, J.C., Rubin, E.S. and Anthony, E.J., Ind. Eng. Chem. Res., 2004, 43, 3462.
Bello, A. and Idem, R.O., Ind. Eng. Chem Res., 2005, 44, 945.
Uyanga, I.J. and Idem, R.O., Ind. Eng. Chem. Res., 2007, 46, 2558.
Yu, H., Xiang, Q., Fang, M., Yang, Q. and Feron, P. Ghg Sci. Technol., 2012, 2, 1.
Delfort, B., Carrette, P.L., FR-A-2909010; Heldebrandt, D.J., Yonker, C.R., Jessop, P.G., and Phan, L., Energy Environ. Sci., 2008, 1, 487.
Ren, J., Wu, L. and Li, B-G. Ind. Eng. Chem. Res., 2013, 52, 8565.
Wang, C., Luo, X., Luo, H., Jiang, D., Li, H. and Dai, S., Angew. Chem. Int. Ed., 2011, 50, 4918.
Tornow, C.E., Thorson, M.R., Ma, S., Gerwith, A.A. and Kenis, P.J.A., J. Am. Chem. Soc., 2012, 134, 19520.
Chen, K., Lin, R., Liao, P., He, C. Lin, J., Xue, W., Zhang, Y., Zhang, J. and Chen, X., Crystal Growth and Design, 2013, 13, 2118.
Zhai, Q., Lin, Q., Wu, T., Wang, L., Zheng, S., Bu, X. and Feng, P., Chem. of Materials, 2012, 24, 2624.
Scholes, C.A., Stevens, G.W. and Kentish, S.E. Fuel, 2012, 96, 15.
Im, J., Hong, S. Y., Cheon, Y., Lee, J., Lee, J. S., Kim, H. S., Cheong, M. and Park, H., Energy Environ. Sci., 2011, 4, 4284.
Hong, S. Y., Lee, J. S., Cheong, M. and Kim, H. S., Energy Procedia, 2014, 63, 2190.
Barzagli, F., Di Vaira, M., Mani, F. and Peruzzini, M., ChemSusChem, 2012, 5, 1724.
Barzagli, F., Lai, S. and Mani, F., Energy Procedia, 2014, 63, 1795.
M.C. Stern, F. Simeon, H. Herzog and T.A. Hatton, Energy Environ. Sci., 2013, 6, 2505.
Knuutila H et al: "Kinetics of carbonate based C02 capture systems", Energy Procedia. Elsevier. NL. vol. 1, No. 1, Feb. 1, 2009 (Feb. 1, 2009). pp. 1011-1018. XP026471981. ISSN: 1876-6102. DOI: 10.1016/J.EGYPRO.2009.01.134 [retrieved on Feb. 1, 2009].
Gurkan, Burcu E., et al. "Equimolar CO 2 Absorption by Anion-Functionalized Ionic Liquids," Journal of the American Chemical Society, vol. 132, No. 7, Feb. 1, 2010, pp. 2116-2117.

Figure 1

KOAc = potassium acetate; KProp = potassium propionate; KiBut = potassium iso-butyrate; KVal = potassium valerate; KiVal = potassium iso-valerate; KHex = potassium hexanoate; KOct = potassium octanoate

C1—C8 CARBOXYLIC ACID SALT SOLUTION FOR THE ABSORPTION OF $CO_2$

CROSS REFERENCE TO RELATED APPLICATIONS

This application is a continuation application of U.S. patent application Ser. No. 16/634,743 filed Jan. 28, 2020, which is a 35 U.S.C. § 371 U.S. national phase entry of International Application No. PCT/GB2018/052209 having an international filing date of Aug. 2, 2018, which claims the benefit of Great Britain Application No. 1712465.2 filed Aug. 2, 2017, each of which is incorporated herein by reference in its entirety.

FIELD OF THE INVENTION

The present invention is concerned with a method for the capture and subsequent release of acid gases such as carbon dioxide. Capture involves contacting the gas with an aqueous solution of a carboxylate salt.

BACKGROUND TO THE INVENTION

As a result of the increasing use of fossil fuels, the concentration of carbon dioxide in the atmosphere has risen from 280 ppm in pre-industrial times, to almost 400 ppm in 2013, leading to rises in average global temperatures. This is expected to increase further in the short- to mid-term until energy supplies which do not result in significant $CO_2$ emissions become established. According to the International Energy Agency World Energy Outlook (2002), the predicted increase in combustion generated $CO_2$ emissions is around 1.8% per year and by 2030, if it continues at that rate, it will be 70% above 2000 levels.

Current methods for capture of $CO_2$ and other acid gases are expensive and far from ideal for large scale application, so the present invention attempts to address this problem by providing a solution which is relatively simple, and uses inexpensive processes and consumables, designed to minimise the overall environmental impact of large scale deployment.

WO2015/092427 discloses a methodology for the capture and release of $CO_2$ and other acid gases using carboxylate salts are dissolved in a mixture of a protic solvent (e.g. water) and a non-aqueous organic solvent. The inventors identified that the presence of a non-aqueous solvent environment increases the pKa of carbonic acid (or more specifically, aqueous $CO_2$) to a much lesser degree than it does the pKa of the carboxylic acid, meaning that the carboxylate ions become effective capture agents. This allows exploitation of non-conventional capture agents under non-conventional conditions to eliminate or ameliorate many of the peripheral disadvantages associated with the current state-of-the-art capture technologies but most critically reduces the energy input requirement for the full capture and release cycle to levels not considered possible up to now.

The use of the non-aqueous solvent presents problems from a practical point of view that could limit the utility of this technology. The solvents tend to have moderate volatility, meaning that replenishment is needed, the solvents tend to be combustible, leading to additional safety measures and the solvents can undergo a small amount of degradation as they are exposed to impurities, e.g. oxygen, in the gas comprising the acid gas. Nevertheless, it was thought, however, that carboxylate salts would be ineffective as capture agents without the non-aqueous solvent because the pKa of the conjugate acid is too low for them to react with aqueous $CO_2$ and carbonic acid to displace the carbon dioxide hydration equilibrium.

SUMMARY OF THE INVENTION

In a first aspect of the present invention is provided a method for the effective capture of an acid gas. The method comprises:

a. capturing an acid gas by contacting said acid gas with a capture composition comprising at least one salt of a carboxylic acid dissolved in a solvent system consisting substantially of water.

The method may also comprise:

b. releasing said at least one acid gas by heating the loaded capture composition, and/or by subjecting the loaded capture composition to a stream of stripping gas, for example air, and/or by reducing the pressure above the loaded capture composition The method may also comprise:

c. regenerating the capture composition by cooling and/or increasing the pressure above the capture composition The present invention derives from an appreciation on the part of the inventors that the pKa value of a given compound, which is a function of the stability of its conjugate base, can be dependent on the total characteristics of the solvent environment in which the pKa is measured.

TABLE 1

Variation of the pKa of acetic acid in different solvents

| Entry | Solvent | pKa |
|---|---|---|
| 1 | Water | 4.76 |
| 2 | Methanol | 9.7 |
| 3 | Ethanol | 10.3 |
| 4 | Dimethyl Sulfoxide | 12.3 |
| 5 | Dimethylformamide | 13.3 |
| 6 | tert-Butanol | 14.2 |
| 7 | 1,2-Dichloroethane | 15.5 |
| 8 | Acetonitrile | 23.51 |

It is a well-established principle that the pKa of a given compound can vary significantly when it is measured in different solvents (Table 1). The pKa values given in data tables are assumed to be at "infinite dilution" such that the intermolecular interactions between molecules of the compound being tested, and the contribution of the solute to the overall solvent characteristics, can be ignored. In practice, the dilution of the compound being measured is dependent on the sensitivity of the measuring technique with milli- and micro-molar concentrations being typical.

When considering solutions of compounds that are several orders of magnitude more concentrated than those used to measure the pKa values quoted in data tables, the contribution of the compound to the overall solvent environment must be considered. For highly soluble compounds, the proportions of the final mixture may be such that they might more appropriately be considered "solvent in X" rather than "X in solvent" (Table 2, solubility data from https://en.wikipedia.org/wiki/Solubility_table, accessed 14 Jul. 2017).

TABLE 2

Mass percentages of saturated aqueous solutions of highly soluble compounds at 20° C.

| Entry | Compound | Mass % Solute | Mass % Water |
|---|---|---|---|
| 1 | Antimony Trifluoride | 81.62 | 18.38 |
| 2 | Barium Perchlorate | 77.06 | 22.94 |
| 3 | Caesium Acetate | 91.00 | 9.00 |
| 4 | Fructose | 78.95 | 21.05 |
| 5 | Indium(III) Bromide | 85.10 | 14.90 |
| 6 | Lithium Chlorate | 78.81 | 21.19 |
| 7 | Rubidium Formate | 84.71 | 15.29 |

The pKa value of a given compound can therefore be considered a dynamic property dependent on, amongst other factors, the concentration at which that compound is present in solution. Strictly speaking, the pKa values quoted in data tables are only accurate for the stated solvent and at the concentration at which the value was measured. For more concentrated solutions, different pKa values can be observed with correspondingly different acid-base reactivity behaviour.

The present application exploits this phenomenon by employing aqueous solutions of carboxylate salts as capture agents for carbon dioxide and other acid gases. Carboxylate salts would not normally be considered to be effective capture agents given the relatively low pKa of their conjugates acids (typically ~5). However, for concentrated solutions, the pKa of carboxylate salts can be sufficiently high as to allow for effective acid gas capture.

Critically for these formulations, when comparing them to other carbon dioxide capture systems, the products of the capture reaction are a bicarbonate salt and corresponding carboxylic acid (Scheme 1). Thermodynamically speaking this represents a more finely balanced system, compared to more conventional capture systems, which can significantly reduce the temperature, and therefore the energy input, required for effective release.

Scheme 1

In principle, bicarbonates and other acid gas salts (and the corresponding acid gases) will also change pKa values based upon the composition of the solution but, surprisingly, this does not occur to the same degree as for carboxylate salts. It is the difference between the relative changes in the pKa values of acid gases and carboxylate salts that allows effective capture by these concentrated solutions.

Compared to the capture compositions described in WO2015/092427, acid gases can be released from the capture compositions of the present invention at a lower temperature, thus reducing the energy consumed during the process. Typically, the compositions described in WO2015/09427 require heating to over 100° C. to release a significant portion of the $CO_2$ that has been captured. In contrast, the compositions of the present invention can release a significant portion of the $CO_2$ when heated to 80° C. or even lower.

It may be that the salt of a carboxylic acid is a metal, ammonium, phosphonium or sulfonium salt. It may be that the salt of a carboxylic acid is a metal salt. It may be that the salt of a carboxylic acid is a salt of an alkali metal such as lithium, sodium or potassium. It may be that the salt of a carboxylic acid is a potassium salt. It may be that the salt of a carboxylic acid is an alkylammonium or arylammonium salt for example a triethylammonium, tetramethylammonium, tetrabutylammonium, benzyltrimethylammonium, a choline salt, or a guanidinium salt. It may be that the salt of a carboxylic acid is a combination of two or more cations.

Salts of aliphatic, aromatic, or heteroaromatic carboxylic acids (e.g. salts of aliphatic or aromatic carboxylic acids) may be used for the purposes of the invention. Suitable aliphatic carboxylic acids may be selected from straight chained, branched or cyclic carboxylic acids which may be saturated or unsaturated, substituted or unsubstituted by substituent groups, heteroatoms, aromatic or heteroaromatic rings systems. The carboxylic acid or each carboxylic acid may comprise a single carboxylic acid group. Polycarboxylic acids, such as di-, tri- or tetra-carboxylic acids are also suitable, as are polymeric acids such as polyacrylic and polymethacrylic acids and naturally derived biopolymeric carboxylic acids, for example alginic acid (from seaweed) and pectin (from plant cell walls). Salts of aromatic or heteroaromatic carboxylic acids, such as benzoic acid, are also suitable for the purposes of the invention as are zwitterionic carboxylate salts, including betaine and associated derivatives and homologues. Such salts may be in solution, slurry or dispersion.

It may be that the carboxylic acid is not an amino acid or each carboxylic acid is not an amino acid. It may be that the carboxylic acid does not comprise nitrogen or each carboxylic acid does not comprise nitrogen. It may be that the capture composition is substantially free of amino acids. It may be that the capture composition is substantially free of any organic compounds that comprise nitrogen. The term 'substantially free' may be considered to mean that no more than 25% of the capture composition is amino acid or an organic compound that comprises nitrogen. It may mean that no more than 10% of the capture composition is amino acid or an organic compound that comprises nitrogen. It may mean that no more than 5% of the capture composition is amino acid or an organic compound that comprises nitrogen. It may mean that no more than 2% of the capture composition is amino acid or an organic compound that comprises nitrogen. It may mean that no more than 1% of the capture composition is amino acid or an organic compound that comprises nitrogen.

Typically, said salt is a salt of a $C_{1-20}$ aliphatic carboxylic acid, more typically a salt of $C_{1-8}$ aliphatic carboxylic acid. Said aliphatic carboxylic acid may be straight chained or branched. Exemplary acids include acetic acid, propionic acid, butyric acid, iso-butyric acid, pivalic acid and hexanoic acid. In certain specific embodiments, the salt is a potassium salt of an aliphatic carboxylic acids, e.g. potassium salt of a $C_{1-8}$ aliphatic carboxylic acids, that may be straight chained or branched.

It may be that said salt of a carboxylic acid is present in the final composition at a level ≤30% w/w relative to the total composition It may be that the at least one salt of a carboxylic acid is a single salt of a carboxylic acid. It may be that it is a mixture of two or more salts of carboxylic acids. Where the salts are present as a mixture of two or more salts, it may be that the two or more salts will comprise the same cationic counterion but be derived from different carboxylic acids and/or it may be that the two or more salts are derived from the same carboxylic acid but with varying cationic counterions. It may be a mixture of at least one salt of a $C_1$-$C_4$ aliphatic carboxylic acid, that may be straight chained or branched, and at least one salt of a $C_5$-$C_6$ aliphatic carboxylic acids, that may be straight chained or branched. It may be that both salts are potassium salts of the indicated carboxylic acids.

Aliphatic carboxylic acids, that may be straight chained or branched, may be unsubstituted by substituent groups that include heteroatoms, e.g. atoms selected from O, N, S and P. Aliphatic carboxylic acids may, however, be substituted by a substituent group that comprise O, e.g. a hydroxyl group. An illustrative example is lactic acid.

Said at least one salt of a carboxylic acid is typically initially present in said composition at a level of between 0.1 M and 14 M relative to the initial solvent composition, most typically in the range 4 M to 10 M. Where the at least one salt is a mixture of two or more salts of carboxylic acids, the concentration indicated is the sum of the concentrations of the two or more salts.

It may be that the at least one salt of a carboxylic acid (e.g. a single salt of a carboxylic acid) is present at a concentration of greater than 4 M. It may be that the at least one salt of a carboxylic acid (e.g. a single salt of a carboxylic acid) is present at a concentration of greater than 5 M. It may be that the at least one salt of a carboxylic acid (e.g. a single salt of a carboxylic acid) is present at a concentration of greater than 6 M. In these embodiments, it may be that the salt of a carboxylic acid is a salt of a $C_{1-4}$ aliphatic carboxylic acids, that may be straight chained or branched. It may be that the salt of a carboxylic acid is a potassium salt of a $C_{1-4}$ aliphatic carboxylic acids, that may be straight chained or branched.

It may be that the capture composition further comprises a base additive. The base additive is a chemical species that is capable of deprotonating the carboxylic acid from which the salt is derived. Thus, the base additive is a species having a conjugate acid that has a higher pKa than the carboxylic acid from which the salt is derived. The base additive may have a pKa of between 5 and 14 as measured in a dilute aqueous solution. In these embodiments, it may be that the salt of a carboxylic acid is a salt of a $C_{5-8}$ aliphatic carboxylic acid, that may be straight chained or branched. It may be that the salt of a carboxylic acid is a potassium salt of a $C_{5-8}$ aliphatic carboxylic acid that may be straight chained or branched.

It may be that the base additive is present in the composition at a level of ≤70% w/w relative to the total composition.

In instances where said at least one salt of a carboxylic acid is used in combination with a base additive, said at least one salt of a carboxylic acid is typically present in the formulation at a level of between 0.1 M and 5 M relative to the initial solvent composition, most typically in the range 0.1 M and 3 M.

The base additive may be a salt. It may be therefore, that the base additive is not a nitrogen base (e.g. does not comprise an amine).

The base additive may be a salt of a phenol said phenol being optionally substituted with from 1 to 5 groups selected from halo, $C_1$-$C_4$-alkyl, nitro, cyano, $C_1$-$C_4$-haloalkyl, O—$C_1$-$C_4$-haloalkyl, or additional aromatic rings to make a polycyclic phenol. The salt of a phenol may be a salt of an unsubstituted phenol.

The base additive may be a carbonate. The carbonate may be a potassium, sodium, lithium, magnesium or calcium carbonate, or a combination thereof.

Where the base additive is a salt (e.g. a carbonate or a salt of a phenol), the salt may comprise the same cationic counterion as the salt of the carboxylic acid (or the first carboxylic acid previously described) or may comprise an alternative cationic counterion. Thus, the base additive may be a potassium salt.

The base additive may be an amine base. Suitable base additives may, for example, be selected from aliphatic or alicyclic amino derivatives, including primary, secondary or tertiary amines. Suitable aliphatic or alicyclic amino compounds may, for example, be selected from aliphatic amines such as tetramethylethylenediamine (TMEDA), tetraethylmethanediamine (TEM DA), tetramethylmethanediamine (TMMDA), tetramethyl-1,3-diaminopropane (TMPDA) or triethylamine (TEA), hydroxyl-substituted aliphatic or alicyclic amino compounds, such as monoethanolamine (MEA), diethanolamine (DEA), N-methyldiethanolamine (MDEA), 2-diethylaminoethanol (DEAE), 3-(diethylamino)-1,2-propanediol (DAPD) or 2-amino-2-methyl propan-1-ol (AMP), alicyclic amines such as piperazine (PZ), morpholine, piperidine, pyrrolidine or 1,8-diazabicyclo[5.4.0]undec-7-ene (DBU), or amino acids, for example glycine or related compounds.

The base additive may be present in the composition at a concentration of <15 M. The base additive may be present at a concentration of <10 M. The base additive may be present at a concentration of <5 M. The base additive may be present at a concentration of >0.1 M or of >1 M. For example, the base additive may be present in the composition at a concentration of between 0.1 M and 15 M relative to the initial solvent composition, most typically in the range 4 M to 10 M The inventors have found that salts of shorter chain carboxylic acids (e.g. $C_1$-$C_4$-aliphatic carboxylic acids) are capable of holding a larger amount of $CO_2$ in solution. This is due to the higher solubility of the salts of shorter chain carboxylic acids in water. Salts of higher chain carboxylic acids (e.g. $C_5$-$C_8$-aliphatic carboxylic acids) have a lower solubility and therefore provide a lower capacity for holding $CO_2$ in solution. However, salts of higher chain carboxylic acids can provide a faster rate of $CO_2$ absorption than lower chain carboxylic acids. The inventors have found that the capacity of solutions of salts of higher chain carboxylic acids can be increased without unduly reducing the rate of uptake and that this can be achieved either by incorporating salts of smaller chain carboxylic acids or by incorporating a base additive.

The solvent system may be water.

Said salt of a carboxylic acid may be supported by, or immobilised onto, a solid substrate.

Water is essential to the mechanism of acid gas capture both as a medium to bring the reactants together and, in the case of carbon dioxide capture, as a reagent. However excessive water levels can reduce capture performance and efficiency. Typically, water is present in the capture composition at a level ≤70% w/w and most typically ≤50% w/w.

Typically, said acid gas is carbon dioxide. Carbon dioxide may be comprised in a carbon dioxide containing waste gas stream, for example the flue gases from a combustion process, or may be comprised in a carbon dioxide containing raw material gas stream, for example the product gas from an anaerobic digestion process. Other acid gases may include sulfurous gases, such as hydrogen sulfide or sulfur dioxide, or oxidised nitrogenous gases commonly referred to as $NO_x$.

Said capture composition is typically in a liquid form and may optionally comprise, for example, a slurry, a dispersion or a suspension. The viscosity of the capture composition is typically below 50 cP. Typically, however, said composition comprises a solution which generally has a total concentration of at least 1 M. Typically, contacting the at least one acid gas with said composition may conveniently be achieved by passing an acid gas containing gas stream through said composition, for example with a bubble tray column, alongside said composition, for example in a packed column, or using any other process known to those skilled in the art.

The method of the invention is typically applied to the capture and release of carbon dioxide and is most conveniently carried out by initially contacting the gas, typically carbon dioxide, with the composition in aqueous solution at typically −20° to 100° C., most typically 10° to 50° C. These are the initial temperatures of contact and the temperature may subsequently rise as a consequence of the exothermicity of the capture reaction.

Gas capture may be achieved at pressures in the range 0 to 300 Bara. In specific embodiments capture of gas may typically be achieved at pressures around 1 to 2 Bara; in alternative embodiments using pressurised systems, capture of gas typically occurs at pressures in the range 0 to 30 Bara, most typically 20 Bara.

Release of the gas typically occurs at temperatures which are in the range of from 0° to 200° C., most typically in the range of 40° to 140° C., e.g. 60° to 100° C. Release of the gas is conveniently achieved at pressures in the range of from 0 to 150 Bara. In specific embodiments, release of gas may typically be achieved at pressures of around 1 to 3.5 Bara; in alternative embodiments using pressurised systems, release of gas typically occurs at pressures in the range of from 1 to 30 Bara, most typically around 20 Bara. In some embodiments the release of the gas occurs at a pressure in the range of 0 to 1 Bara.

A particularly useful aspect of the technology is that the release process will generate carbon dioxide or other released gases in enclosed and/or pressurised systems which will allow for increased pressure and this should reduce further compression requirements for storage applications, with important implications for reductions in overall energy consumption for the complete capture and storage process.

Release of the captured gas from the composition via application of heat facilitates regeneration of the composition, such that it may be used for further capture and release operations with further acid gases upon cooling.

Release of the captured gas from the composition via the application of a stream of stripping gas, for example air, requires no further regeneration of the solvent before it can be recycled for further capture and release operations. Release of the captured gas via a stream of stripping gas may be further enhanced via the application of heat.

Release of the captured gas from the composition via the reduction of pressure in the desorption apparatus requires no further regeneration of the solvent before it can be recycled except to return the solvent to absorption pressure. Release of the captured gas via a reduction in pressure in the desorption apparatus may be further enhanced via the application of heat.

The methods of the invention utilise a composition that can be used as a physical solvent as well as a chemical solvent. Embodiments therefore use two $CO_2$ absorption mechanisms, both a physical and a chemical one, working in tandem. This may reduce the overall energy intensity of the $CO_2$ separation process either by increasing the $CO_2$ capacity of the composition at a given absorption pressure, or by reducing the working absorption pressure necessary to achieve a given $CO_2$ capacity.

The methods of the invention are simple and economic to implement and provides a major improvement over the methods of the prior art in terms of capture efficiency and overall process energy requirements whilst significantly improving on the environmental profile by using less hazardous reagents under milder conditions thereby greatly reducing emissions and degradation issues.

The invention may also be as described in the following numbered paragraphs:

1. A method for the capture of at least one acid gas in a composition, the release of said gas from said composition and the subsequent regeneration of said composition for re-use, said method comprising performing, in order, the steps of:
   a. capturing an acid gas by contacting said acid gas with a capture composition comprising at least one salt of a carboxylic acid dissolved in a solvent system consisting substantially of water;
   b. releasing said at least one acid gas by heating the loaded capture composition and/or by subjecting the loaded capture composition to a stream of stripping gas and/or by applying a lower pressure than employed for absorption;
   c. regenerating the capture composition by cooling and/or increasing the pressure.
2. A method as described in paragraph 1, wherein the at least one salt of a carboxylic acid is a single salt of a carboxylic acid.
3. A method as described in paragraph 2, wherein the single salt is present at a concentration of greater than 4 M, optionally 5 M, further optionally 6 M.
4. A method as described in paragraph 3, wherein the single salt is a salt of a $C_1$-$C_4$-aliphatic carboxylic acid, that may be straight chained or branched.
5. A method as described in paragraph 1, wherein at least one salt of a carboxylic acid is a mixture of two or more salts of carboxylic acids.
6. A method as described in paragraph 5, wherein the mixture is a mixture of at least one salt of a $C_1$-$C_4$ aliphatic carboxylic acid, that may be straight chained or branched, and at least one salt of a $C_5$-$C_6$ aliphatic carboxylic acids, that may be straight chained or branched.
7. A method as described in paragraph 5 or paragraph 6, wherein the mixture is a mixture of two or more salts derived from a single carboxylic acid or a mixture of carboxylic acids with differing cationic counterions.
8. A method as described in paragraph 1 or paragraph 2, wherein the capture composition further comprises a base additive.
9. A method as described in paragraph 8, wherein the salt of a carboxylic acid is a salt of a $C_{5-8}$ aliphatic carboxylic acids, that may be straight chained or branched.
10. A method as described in paragraph 8 or paragraph 9, wherein the base additive is a salt of a phenol said phenol being optionally substituted with from 1 to 5 groups selected from halo, $C_1$-$C_4$-alkyl, nitro, cyano, $C_1$-$C_4$-haloalkyl, O—$C_1$-$C_4$-haloalkyl or additional aromatic rings to make a polycyclic phenol.
11. A method as described in paragraph 8 or paragraph 9, wherein the base additive is an amine base.
12. A method as described in paragraph 8 or paragraph 9, wherein the base additive is a carbonate, optionally a lithium, potassium, sodium, magnesium or calcium carbonate, or a combination thereof.
13. A method as described in any preceding paragraph wherein said salt of a carboxylic acid is a metal salt.

14. A method as described in paragraph 12 wherein said salt of a carboxylic acid is a potassium salt.
15. A method as described in any preceding paragraph wherein said at least one acid gas comprises carbon dioxide gas.
16. A method as described in any preceding paragraph wherein said release of said at least one acid gas occurs at a temperature in the range 60° to 100° C.
17. A method as described in any preceding paragraph wherein said release of said at least one acid gas occurs at a pressure in the range 0 to 1 Bara.

BRIEF DESCRIPTION OF THE DRAWINGS

Embodiments of the invention are further described hereinafter with reference to the accompanying drawings, in which.

DESCRIPTION OF THE INVENTION

The term 'consisting substantially of water' means that the solvent system in which the carboxylic acid salt and any additional components are dissolved is substantially free of organic solvents. Thus, it may be that the solvent system in which the carboxylic acid salt and any additional components are dissolved comprises at least 50% water, e.g. at least 75% water, 90% water, 95% water or 98% water, such as at least 99% water. Thus, where the capture composition comprises only a carboxylic acid salt, the carboxylic acid salt is dissolved in a solvent system that comprises at least 50% water, e.g. at least 75%, at least 90% water, at least 95% water, 98% water, or at least 99% water. Where the capture composition comprises a base additive, the carboxylic acid salt and the base additive are dissolved in a solvent system that comprises at least 50% water, e.g. at least 75% water, at least 90% water, at least 95% water, at least 98% water, or at least 99% water.

The term 'solvent system' refers to the mixture of liquids in which the carboxylic acid salt and any base additive or other components are dissolved. The term 'capture composition' refers to the total composition, i.e. both the solvent system and the carboxylic acid salt and any base additive or other components. Because the concentration of the carboxylic acid salt can be very high, the 'capture composition' may contain only a small amount of the 'solvent system' and therefore only a small amount of water. Nevertheless, the liquid in which the carboxylic acid is dissolved (i.e. the solvent system) will consist substantially of water.

The present inventors have provided a new system of acid gas capture compositions that provides significant advantages over the methods of the prior art and finds potential applications in areas such as power stations, cement manufacture, iron and steel manufacture, glass making, brewing, syngas processes, natural gas and biogas purification and other chemical process such as ammonia production, hydrogen production, power-to-gas (e.g. Sabatier reaction) processes, as well as any other acid gas producing industrial, commercial or domestic processes. In a particular application, the defined method may be applied to the capture of carbon dioxide directly from the atmosphere.

As well as such applications, the compositions provided by the present invention are also appropriate for use in smaller scale specialist applications such as, for example, in submarines, spacecraft and other enclosed environments.

A particular embodiment of the invention envisages the application of the disclosed method to the capture and subsequent release of carbon dioxide. The incorporation of carbon dioxide into a substrate is known as carboxylation; the removal of carbon dioxide is known as decarboxylation. This carboxylation/decarboxylation process is key to effective carbon dioxide capture and capture formulation regeneration.

The present invention also envisages the use of the disclosed formulations in the capture and subsequent release of other acid gases, for example hydrogen sulfide or sulfur dioxide, in applications such as natural gas sweetening, biogas upgrading and desulfurization. Removal of $NO_x$ species from, for example, the waste gases from a combustion process may be an additional application.

In specific embodiments of the invention, systems are provided wherein carbon dioxide is captured by use of formulations which comprise potassium acetate, potassium propionate, potassium iso-butyrate and potassium hexanoate in water either solely or in combination with each other or in combination with, for example, potassium carbonate or potassium phenolate. The use of such systems facilitates the highly efficient capture of the gas at ambient temperature and pressure.

Thus, the inventors have conducted a series of trials utilising equipment adapted for the measurement of vapour-liquid equilibria (VLE). Specifically a system was provided which comprised a jacketed stainless steel vessel with the jacket connected to a temperature controlled circulating bath and the vessel equipped with two temperature probes (one for monitoring vapour temperature, one for solvent temperature), a 0-7 Bara pressure transducer, a safety release valve and emergency rupture disc, a vacuum port for removing the internal atmosphere, a carbon dioxide inlet, an air inlet and gas entraining mechanical stirring. Carbon dioxide is supplied from a temperature and pressure monitored high pressure burette via a regulator to control the internal pressure of the VLE vessel and thus the partial pressure of carbon dioxide.

TABLE 3

Maximum absorption rate and capacity for carboxylate salts

| Entry | Salt | [Salt] (mol/L) | Maximum $CO_2$ Capacity (mol/L) | Maximum Absorption Rate ($mol_{CO2}$/L/Bar/h) |
| --- | --- | --- | --- | --- |
| 1 | Potassium acetate | 8 | 1.24 | 2.5 |
| 2 | Potassium acetate | 9 | 1.84 | 1.6 |
| 3 | Potassium propionate | 7 | 1.77 | 2.9 |
| 4 | Potassium iso-butyrate | 7 | 1.97 | 2.5 |

TABLE 3-continued

Maximum absorption rate and capacity for carboxylate salts

| Entry | Salt | [Salt] (mol/L) | Maximum $CO_2$ Capacity (mol/L) | Maximum Absorption Rate ($mol_{CO2}$/L/Bar/h) |
|---|---|---|---|---|
| 5 | Potassium valerate | 4 | 0.37 | 6.2 |
| 6 | Potassium hexanoate | 2.5 | 0.30 | 6.6 |
| 7 | Potassium octanoate | 2.4 | 0.45 | 3.5 |

150 mL of aqueous solution in the VLE vessel under 1 Bar of $CO_2$ at initial temperature of 20° C.

From the data collected (150 mL of aqueous solution in the VLE vessel under 1 Bar of CO2 at initial temperature of 20° C. Table 3), for a given formulation, it is possible to determine the absolute rate of carbon dioxide absorption, the rate of carbon dioxide absorption as a function of carbon dioxide partial pressure, the overall carbon dioxide capacity as a function of temperature and/or carbon dioxide partial pressure. Combining data from a series of experiments for a particular formulation allows predictions to be made regarding the performance of said formulation in a real process.

In order to demonstrate the highly effective nature of the systems, experimental campaigns were undertaken with a broad range of single carboxylate salts, mixed carboxylate salts and other capture agents accelerated by carboxylate salts all in aqueous solution.

Figure 1:
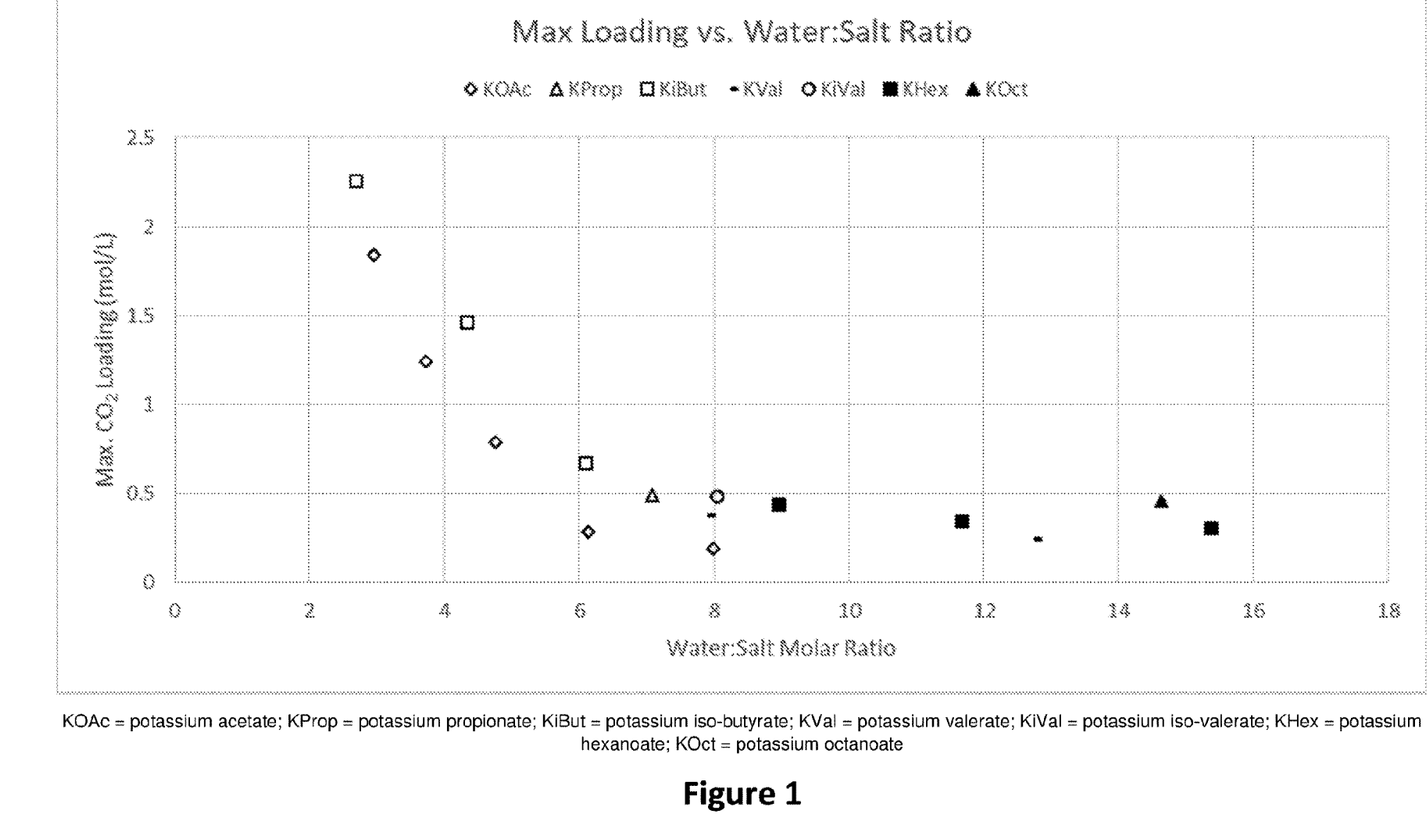
FIG. 1 illustrates the relationship between the maximum capture capacity of concentrated carboxylic acid salt solutions under 1 Bar partial pressure of $CO_2$ and the water:salt molar ratios found in said solutions.

From the data collected with the VLE, it is possible to draw a graph of maximum solution capacity vs. water:salt molar ratio (FIG. 1). As can be seen, there is a significant increase in the capacity of these formulations once the water:salt molar ratio drops below approximately 6. This supports the claim that the contribution of the salt to the overall solvent character of the formulation is an important factor when determining the apparent pKa of carboxylate salts in such formulations.

The efficacy of stripping from these formulations is boosted by the mechanism of acid gas absorption. Under these conditions, the thermodynamics of the reaction between hydrated carbon dioxide and the carboxylates salts is more finely balanced than for more conventional capture agents, allowing regeneration to be less energy intensive. Experiments undertaken in the VLE with 7 M potassium acetate in water at a variety of temperatures prove this to be the case. With a ΔT of just 20° C. between the absorber and the desorber, in principle a cyclic carbon dioxide capacity of nearly 0.6 $mol_{CO2}$/L is possible (150 mL of 7 M KOAc solution in VLE under 1 Bar CO2 Table 4).

TABLE 4

Maximum $CO_2$ capacity of 7M KOAc solutions at different absorption temperatures

| Entry | Temperature (° C.) | Max Capacity (mol/L) |
|---|---|---|
| 1 | 10 | 1.01 |
| 2 | 20 | 0.69 |
| 3 | 30 | 0.43 |

150 mL of 7M KOAc solution in VLE under 1 Bar $CO_2$

Varying the pressure of carbon dioxide during absorption has an influence on both the absolute rate of carbon dioxide absorption as well as the maximum capacity of the solution. To ensure that the herein disclosed method is generally applicable, experiments have been undertaken at partial pressures of carbon dioxide both above and below 1 Bar (150 mL of solution in the VLE at 20° C. under pressure of CO2 Table 5).

TABLE 5

Effect of $CO_2$ pressure on absolute absorption rate and capacity

| Entry | Solution | $CO_2$ Pressure (Bar) | Absolute Rate ($mM_{CO2}$/s) | Maximum Capacity ($mol_{CO2}$/L) |
|---|---|---|---|---|
| 1 | 7M Potassium acetate | 1 | 0.6 | 0.69 |
| 2 | 7M Potassium acetate | 2 | 1.3 | 1.05 |
| 3 | 7M Potassium acetate | 3 | 2.2 | 1.28 |
| 4 | 7M Potassium acetate | 4 | 3.0 | 1.48 |
| 5 | 7M Potassium iso-butyrate | 0.3 | 0.15 | 1.61 |
| 6 | 7M Potassium iso-butyrate | 1.0 | 0.7 | 1.97 |
| 7 | 7M Potassium iso-butyrate | 2.0 | 1.5 | 2.35 |

150 mL of solution in the VLE at 20° C. under pressure of $CO_2$

The variation in $CO_2$ capacity of these formulations as a function of $CO_2$ partial pressure demonstrates that the formulations may be used as physical solvents as well as chemical solvents. The advantage such a system configuration would present would be to have two $CO_2$ absorption mechanisms, both a physical and a chemical one, working in tandem. This would reduce the overall energy intensity of the $CO_2$ separation process either by increasing the $CO_2$ capacity of the working fluid at a given absorption pressure or by reducing the working absorption pressure necessary to achieve a given $CO_2$ capacity.

Figure 2:
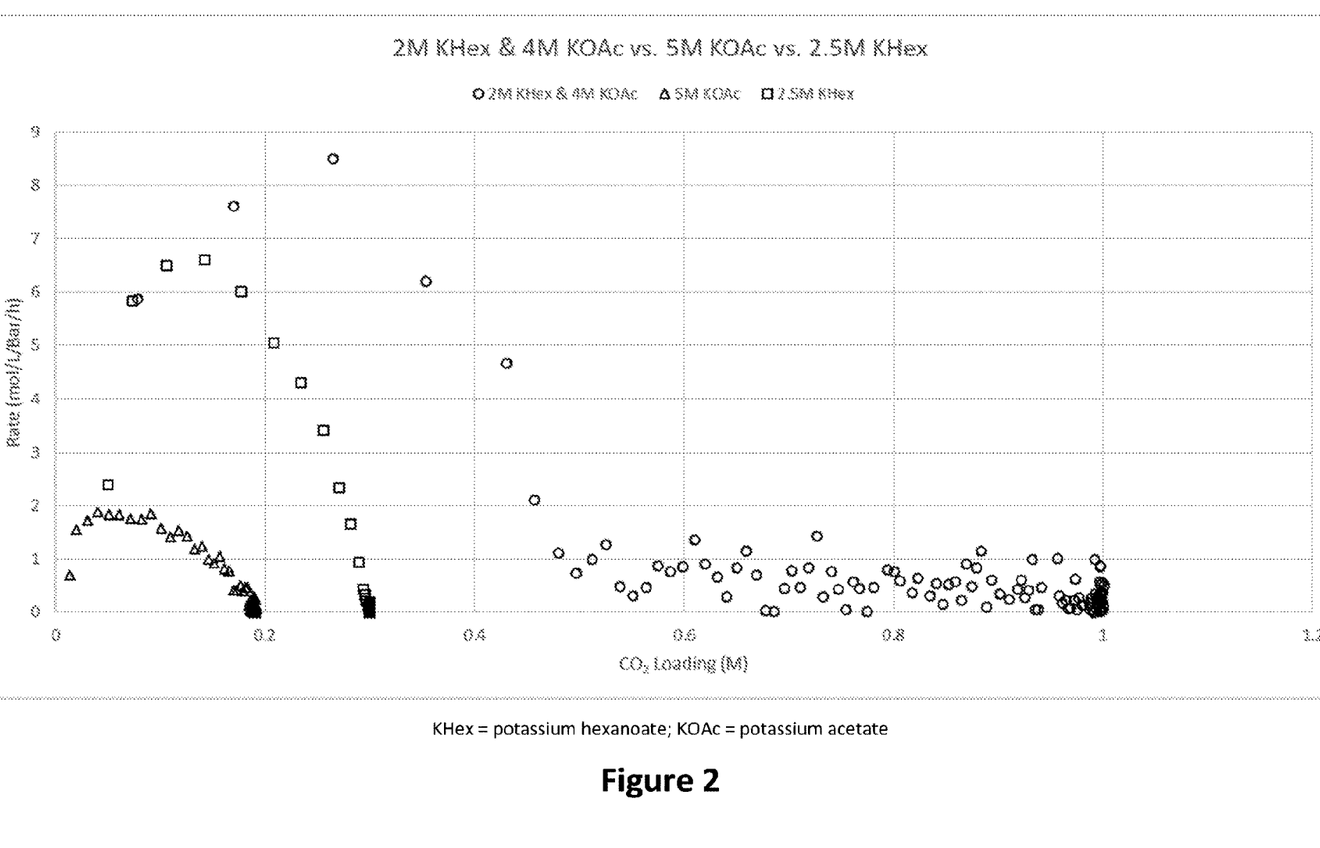
FIG. 2 shows the improvement in $CO_2$ capture rate and capacity garnered through blending potassium hexanoate and potassium acetate as compared to each component alone.

Combining two or more salts in the same solutions can have unexpected effects. For example, a solution containing 1.5 M potassium hexanoate and 4 M potassium iso-butyrate has a maximum capacity of 1.3 $mol_{CO2}$/L, significantly greater than either individual component or the sum of their individual capacities. Similarly, a blend of 2 M potassium hexanoate with 4 M potassium acetate shows greater capacity than either component or the sum of its parts, at a greater absorption rate than would be expected from either component. This is demonstrated in FIG. 2. As can be extrapolated from FIG. 2, 2 M potassium hexanoate would be expected to have a capacity of about 0.2 to 0.25 M $CO_2$ and 4 M potassium acetate a capacity of about 0.1 to 0.15 M; while FIG. 2 indicates that a blend of 2 M potassium hexanoate with 4 M potassium acetate has a capacity of at least 1 M $CO_2$.

Figure 3:
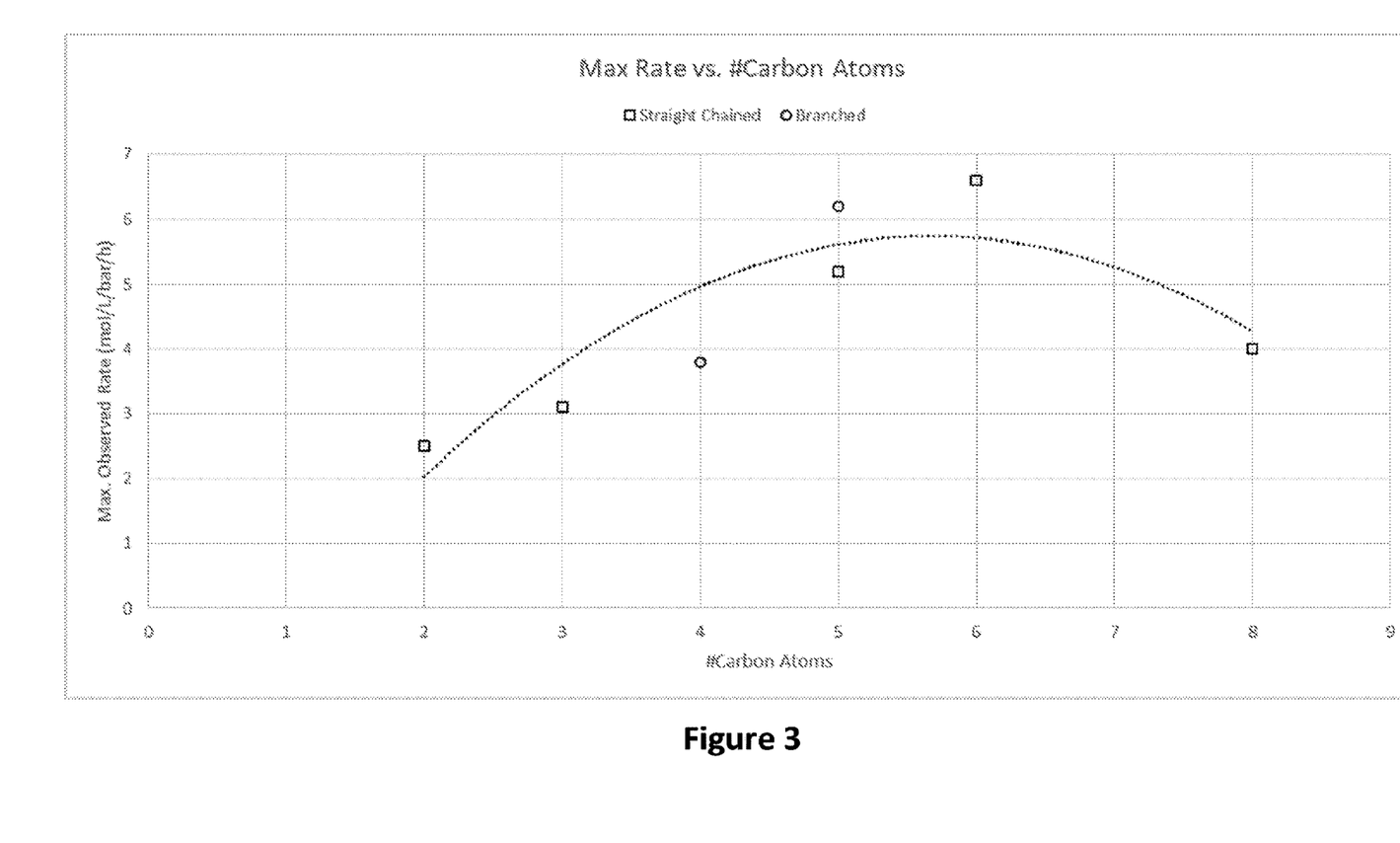
FIG. 3 illustrates the relationship between the number of carbon atoms in various carboxylic acid salts and the maximum observed rate of carbon dioxide absorption under 1 bar partial pressure of $CO_2$.

There is a relationship between the total number of carbon atoms in the carboxylate salt and the maximum observed rate. As can be seen, this peaks at around five or six carbon atoms in the carboxylate salt (FIG. 3).

Figure 4:
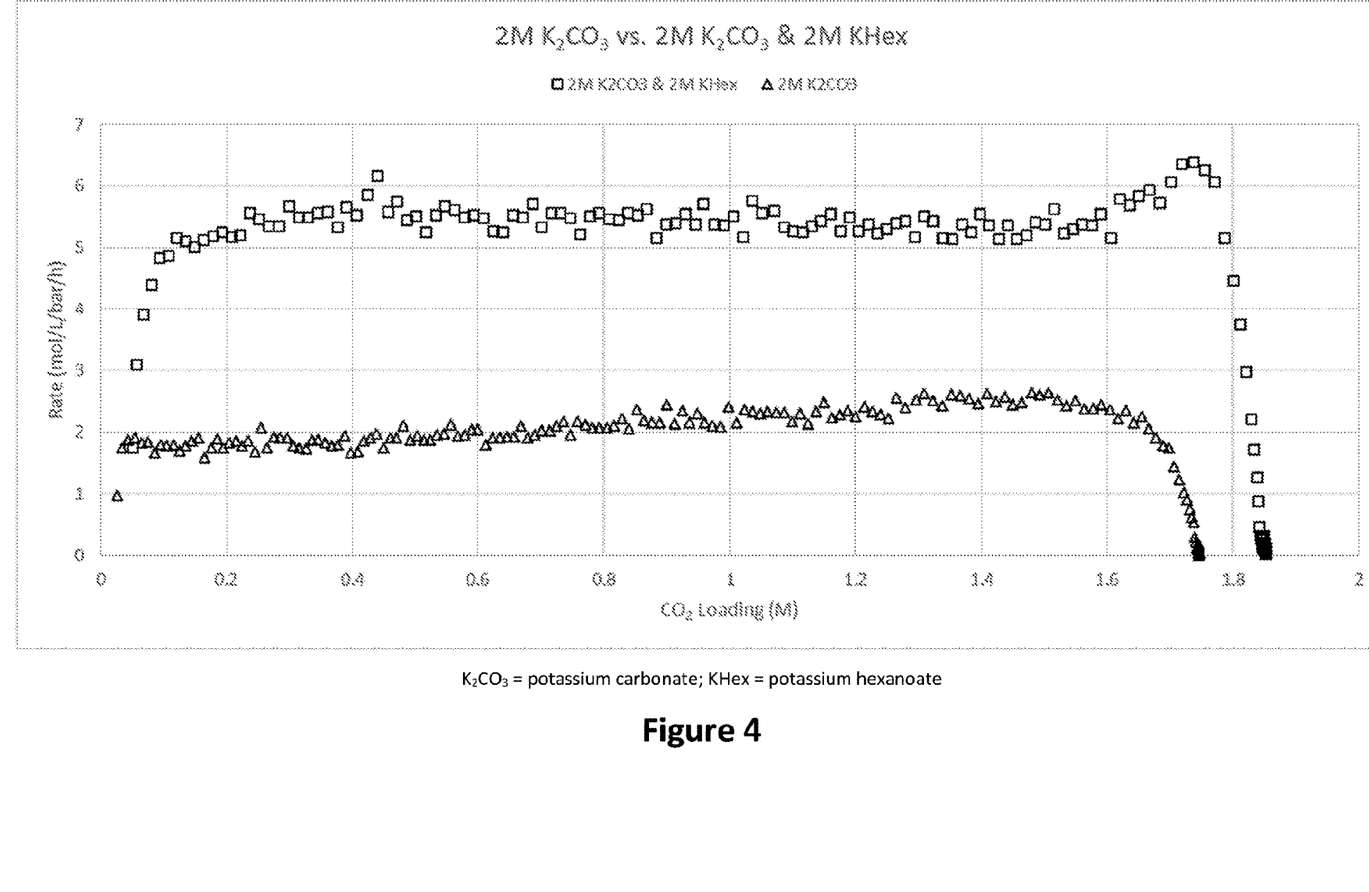
FIG. 4 shows the improvement in rate of carbon dioxide absorption into a 2 M solution of potassium carbonate via the addition of 2 M potassium hexanoate.

This can be exploited by blending faster carboxylate salts with a second component that is basic enough to effect deprotonation of the carboxylic acid as it forms and holding the captured carbon dioxide as bicarbonate in solution. Specific examples include carbonate and phenolate salts of, for example, lithium, sodium, potassium, calcium or magnesium. Adding 2 mol/L potassium hexanoate to a 2 M solution of potassium carbonate has little impact on the overall capacity of the solution but increases the rate of carbon dioxide absorption by more than a factor of two (FIG. 4).

Similarly, a solution consisting of 2.5 M potassium hexanoate and 1 M potassium phenolate exhibits a faster rate of absorption (+25%) and greater capacity (+100%) as compared to a 2.5 M solution of potassium hexanoate alone.

This accelerating effect extends to other capture agents that might otherwise be considered "slow". Adding 1 M potassium hexanoate to a 5 M solution of 2-amino-2-methyl-1-propanol (AMP) increases the rate of carbon dioxide absorption by approximately 30%. This effect remains after a full absorption and release cycle for a second absorption.

Carboxylate solutions themselves can have their rate of carbon dioxide absorption accelerated by the usual accelerants known to those skilled in the art. For example, including 250 mg/L of carbonic anhydrase in a 7 M solution of potassium acetate increases the rate of carbon dioxide absorption by approximately 15%.

The invention claimed is:

1. A method for the capture of at least one acid gas in a composition, said method comprising:
    capturing an acid gas by contacting said acid gas with a capture composition comprising at least one salt of a carboxylic acid dissolved in a solvent system to form a loaded capture composition, wherein said solvent system comprises at least 95% water,
    wherein the solvent system is a mixture of liquids in which the carboxylic acid salt is dissolved,
    wherein said salt of a carboxylic acid is an unsubstituted alkylammonium salt, an arylammonium salt, a choline salt, or a guanidinium salt,
    wherein said capture composition comprises no more than 1% of amino acids or salts of amino acids, and
    wherein said at least one acid gas comprises carbon dioxide.

2. A method as claimed in claim 1, wherein said at least one acid gas further comprises hydrogen sulphide.

3. A method as claimed in claim 1, wherein said at least one acid gas further comprises sulphur dioxide.

4. A method of claim 1, further comprising performing, in order, the steps of:
    releasing said at least one acid gas by heating the loaded capture composition and/or by subjecting the loaded capture composition to a stream of stripping gas and/or by applying a lower pressure than employed for absorption;
    regenerating the capture composition by cooling and/or increasing the pressure.

5. A method as claimed in claim 4, wherein said release of said at least one acid gas occurs at a temperature in the range 60° to 100° C.

6. A method as claimed in claim 4, wherein said release of said at least one acid gas occurs at a pressure of 1 Bara or less.

7. A method as claimed in claim 1, wherein the at least one salt of a carboxylic acid is a single salt of a carboxylic acid.

8. A method as claimed in claim 7, wherein the single salt is present at a concentration of greater than 4 M.

9. A method as claimed in claim 7, wherein the single salt is present at a concentration of greater than 6 M.

10. A method as claimed in claim 7, wherein the single salt is a salt of a $C_1$-$C_{20}$-aliphatic carboxylic acid, that may be straight chained or branched.

11. A method as claimed in claim 10, wherein the single salt is a salt of a $C_1$-$C_8$-aliphatic carboxylic acid, that may be straight chained or branched.

12. A method as claimed in claim 10, wherein the single salt is a salt of a $C_1$-$C_4$-aliphatic carboxylic acid, that may be straight chained or branched.

13. A method as claimed in claim 1, wherein the at least one salt of a carboxylic acid is a mixture of two or more salts of carboxylic acids.

14. A method as claimed in claim 13, wherein the mixture is a mixture of at least one salt of a $C_1$-$C_4$ aliphatic carboxylic acid, that may be straight chained or branched, and at least one salt of a $C_5$-$C_6$ aliphatic carboxylic acid, that may be straight chained or branched.

15. A method as claimed in claim 13, wherein the mixture is a mixture of two or more salts derived from a single carboxylic acid with differing cationic counterions, or two or more salts with the same cationic counterion derived from two or more differing carboxylic acids.

16. A method as claimed in claim 1, wherein the capture composition further comprises a base additive.

17. A method as claimed in claim 16, wherein the salt of a carboxylic acid is a salt of a $C_{5-8}$ aliphatic carboxylic acid, that may be straight chained or branched.

18. A method as claimed in claim 16, wherein the base additive is a salt of a phenol said phenol being optionally substituted with from 1 to 5 groups selected from halo, $C_1$-$C_4$-alkyl, nitro, cyano, $C_1$-$C_4$-haloalkyl, O—$C_1$-$C_4$-haloalkyl or additional aromatic rings to make a polycyclic phenol.

19. A method as claimed in claim 16, wherein the base additive is a carbonate, optionally a lithium, potassium, sodium, magnesium or calcium carbonate, or a combination thereof.

20. A method as claimed in claim 1, wherein said salt of a carboxylic acid is an unsubstituted alkylammonium salt.

21. A method as claimed in claim 20, wherein said salt of a carboxylic acid is a triethylammonium, tetramethylammonium, or tetrabutylammonium salt.

22. A method as claimed in claim 1, wherein said salt of a carboxylic acid is an arylammonium salt.

23. A method as claimed in claim 22, wherein said salt of a carboxylic acid is a benzyltrimethylammonium salt.

* * * * *